(12) United States Patent
Anghel et al.

(10) Patent No.: US 7,045,986 B2
(45) Date of Patent: May 16, 2006

(54) POSITION SENSING METHOD AND APPARATUS FOR SYNCHRONOUS MOTOR GENERATOR SYSTEM

(75) Inventors: Cristian E. Anghel, Mississauga (CA); Rocco DiVito, Etobicoke (CA); Nicolae A. Morcov, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 32 days.

(21) Appl. No.: 10/783,460

(22) Filed: Feb. 20, 2004

(65) Prior Publication Data
US 2005/0184698 A1   Aug. 25, 2005

(51) Int. Cl.
*H02P 3/18*   (2006.01)

(52) U.S. Cl. ............... 318/712; 318/715; 318/716; 318/807

(58) Field of Classification Search ........... 318/700, 318/715, 807, 808, 720, 723, 712, 716
See application file for complete search history.

(56) References Cited

U.S. PATENT DOCUMENTS

| | | | | |
|---|---|---|---|---|
| 4,763,058 | A | | 8/1988 | Heining et al. .......... 318/807 |
| 5,493,200 | A | | 2/1996 | Rozman et al. .......... 322/10 |
| 5,495,163 | A | | 2/1996 | Rozman et al. .......... 322/10 |
| 5,559,419 | A | * | 9/1996 | Jansen et al. ........... 318/808 |
| 5,565,752 | A | * | 10/1996 | Jansen et al. ........... 318/807 |
| 5,585,709 | A | * | 12/1996 | Jansen et al. ........... 318/807 |
| 5,594,322 | A | | 1/1997 | Rozman et al. .......... 322/10 |
| 5,747,971 | A | | 5/1998 | Rozman et al. .......... 322/10 |
| 5,818,192 | A | * | 10/1998 | Nozari .................. 318/609 |
| 5,920,162 | A | | 7/1999 | Hanson et al. .......... 318/254 |
| 6,037,742 | A | * | 3/2000 | Rasmussen ............. 318/807 |
| 6,377,018 | B1 | * | 4/2002 | Tajima et al. .......... 318/727 |
| 6,809,496 | B1 | * | 10/2004 | Anghel et al. .......... 318/700 |
| 2002/0041168 | A1 | | 4/2002 | Mann et al. ............ 318/254 |
| 2002/0079706 | A1 | | 6/2002 | Rebsdorf et al. ........ 290/55 |

FOREIGN PATENT DOCUMENTS

EP    0748 039 A2    12/1996

OTHER PUBLICATIONS

Oxford Danfysik (2004). S06: Beamline Optical Design in Synchrotron Components Catalogue 2004, pp. 58-59. Oxford, UK.

Fernando Briz, et al., Implementation Issues Affecting the Performance of Carrier Signal Injection Based Sensorless Controlled AC Drives, Conference Record of the 2001 IEEE Industry Applications Conference, vol. 1, pp. 2645-2652.

\* cited by examiner

*Primary Examiner*—Rita Leykin
(74) *Attorney, Agent, or Firm*—Birch, Stewart, Kolasch & Birch, LLP (57) ABSTRACT

A position sensing apparatus (300) derives rotor position of a synchronous machine (200) from signals output from the machine (200). In one embodiment, the position sensing apparatus (300) comprises: a bandpass filter (322) that filters phase voltage signals output from main stator windings (216) of the synchronous machine (200) during AC excitation, thereby extracting a rotor position-indicating component from the phase voltage signals; a converter (324) that converts the filtered phase voltages into balanced two-phase quadrature signals, the balanced two-phase quadrature signals indicating positioning of the rotor (212); and an excitation controller (204) for controlling AC excitation frequency as a function of rotor speed.

22 Claims, 5 Drawing Sheets

POSITION SENSING METHOD AND APPARATUS FOR SYNCHRONOUS MOTOR GENERATOR SYSTEM

FIELD OF THE INVENTION

The present invention relates to synchronous machines, and more particularly to a method and apparatus for detecting rotor position in a synchronous motor generator system.

BACKGROUND OF THE INVENTION

A conventional motor generator system, as utilized for example in the aerospace industry, includes a brushless synchronous machine that generates multi-phase AC power from a rotating shaft, e.g., coupled to a gas turbine engine, and DC excitation. In addition to operating in a generator mode, the brushless synchronous machine operates as a starter (motor) to start the aircraft engine. Following a successful engine start the system initiates the generator mode.

Conventionally, motor controllers for applications requiring a controlled torque use discrete sensors to determine rotor position in a rotating machine. This technique, however, increases system complexity and decreases system reliability. The electric machine must have a sensor built in or attached mechanically to the rotor. Interfaces and wiring must be added for control (excitation) and feedback signals between the controller and the sensor. Typical sensors include resolvers, encoders, and the like. The location of the rotating machine could be far from the controller, creating the need for unwanted extra wiring in the system.

Figure 1A:
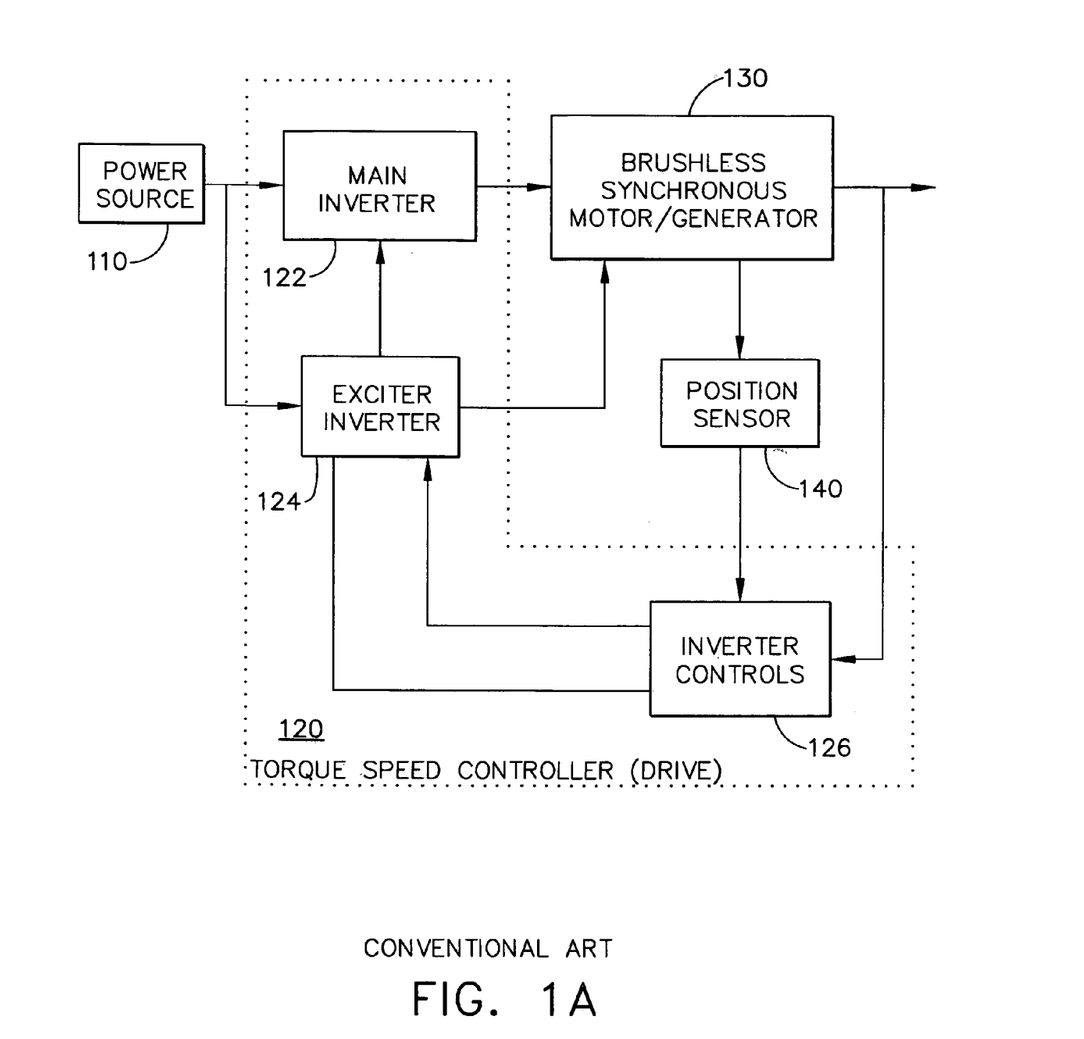
FIG. 1A is a general block diagram of a conventional motor generator system using a position sensor to determine rotor position for motor generator control.

A conventional motor control system having a position sensor is shown in FIG. 1A. The primary components of the system include a power source 110, a controller 120, a motor generator 130 and a speed/position sensor 140. The controller 120 includes inverter control 126 that receives signals from the sensor 140 (e.g., speed/rotor position) and the motor generator 130 (e.g., current, voltage). These signals are used to control the main inverter 122 and exciter inverter 124, thereby providing a conventional closed loop system to regulate the torque/speed/current/voltage of the motor generator 130, as will be appreciated by those skilled in the art.

Figure 1B:
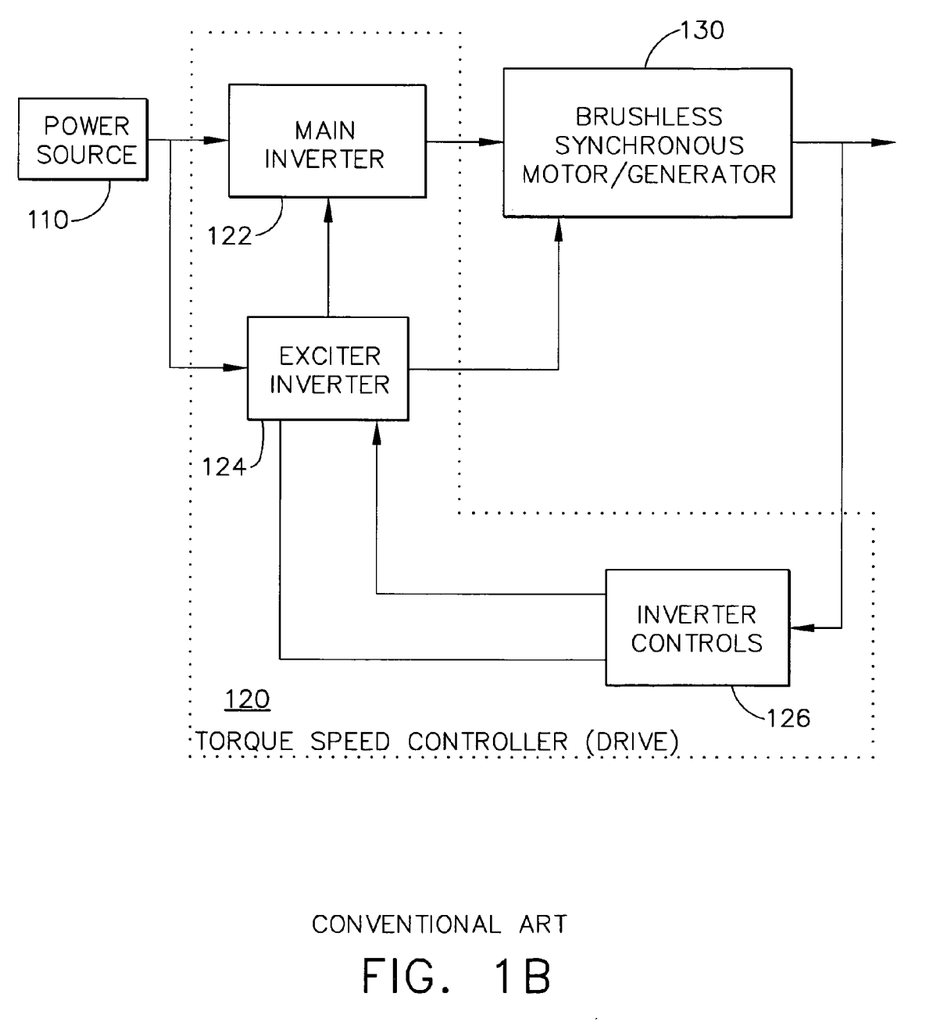
FIG. 1B is a general block diagram of a conventional sensorless motor generator system.

FIG. 1B illustrates a block diagram of a sensorless system. As is apparent from the block diagram, the sensor and related signals to the controller 120 are absent. Those skilled in the art will appreciate that this requires the controller 120 to process the rotor position/speed of the motor generator 130 to allow closed loop torque/speed regulation or to exclude certain control functions (e.g., torque control) or operate in an open loop mode.

Sensorless motor control techniques can increase system reliability and eliminate the need for extra wiring in the system. In addition these techniques eliminate the need for a discrete position sensor and also reduce the system cost. A sensorless motor control technique is a more flexible/adaptable solution for a motor drive system than one that relies on a separate position sensor. It is particularly valuable for an aircraft system where increased reliability and reduction of weight (e.g., through elimination of the sensor and additional wiring) are extremely important.

Motor controller applications in systems with existing electrical machines can use a sensorless motor control scheme. For example, sensorless control systems are advantageous in retrofit applications, where a sensor and appropriate wiring may be unavailable and not easily installed. Some of these systems have synchronous generators that can be used as a motor generator but they do not have discrete sensors. Additional applications for this technique include motor controllers in the environmental control systems, electric power systems, industrial drive systems, and the like.

U.S. Pat. No. 5,920,162 issued to Hanson et al. describes a system that utilizes feed through from the exciter winding of twice the fundamental frequency of excitation thereof which is detected synchronously in one of a plurality of stator phase windings of a main motor generator. The one of a plurality of stator phase windings is maintained in a non-commutated state during operation as a motor to determine rotor position of the main motor generator for control of commutation of current in all other commutated stator phase windings. The amplitude modulation of the voltage across each stator phase winding which is maintained in a non-commutated state represents the rotary position of the rotor of the main motor generator which is used to control commutation of current flow in an at least one and preferably all remaining commutated stator phase.

However, although the above-described system operates as in a sensorless mode, it requires that the position sensing take place only on the non-commutated stator windings. Accordingly, the position sensor emulation must shift from phase to phase as respective phases are commutated, which complicates the sensor emulation. Therefore, it is desired to have a sensor emulation technique and sensorless control system that truly emulates a continuous position sensor and is not dependent on the commutated state of the stator windings. Further, prior art sensorless systems fail to provide initial position sensing at standstill or low speed ranges that is necessary at start-up under high load torque of the motor generator.

SUMMARY OF THE INVENTION

In one aspect, the present invention is a method and an apparatus for deriving the rotor position of a brushless synchronous machine by monitoring the output of stator phase windings and varying an excitation frequency as mechanical rotation speed of the rotor increases to facilitate accurate position detection from the monitored signals. In one aspect, the present invention is a position sensing apparatus for deriving rotor position of a synchronous machine from signals output from the machine, the apparatus comprising: a bandpass filter that filters phase voltage signals output from main stator windings of the synchronous machine during AC excitation, thereby extracting a rotor position-indicating component from the phase voltage signals; a converter that converts the filtered phase voltages into balanced two-phase quadrature signals, the balanced two-phase quadrature signals indicating rotor position; and an excitation controller for controlling AC excitation frequency as a function of rotor speed, thereby increasing the position detection range of the position sensing apparatus.

In another aspect, the present invention is a method for determining the rotor position of a synchronous machine from signals output from the machine, the method comprising: bandpass filtering of phase voltage signals output from main stator windings of the synchronous machine during AC excitation, thereby extracting a rotor position-indicating component from the phase voltage signals; converting the filtered phase voltages into balanced two-phase quadrature signals, the balanced two-phase quadrature signals indicating rotor position; and controlling AC excitation frequency as a function of rotor speed, thereby increasing a position detection range of the position sensing method.

BRIEF DESCRIPTION OF THE DRAWINGS

Other aspects of the present invention will become apparent from the following description taken in conjunction with the accompanying drawings, in which.

DETAILED DESCRIPTION

Embodiments of the present invention are more specifically set forth in the following description, with reference to the appended drawings. In the following description and accompanying drawings like elements are denoted with similar reference numbers. Further, well-known elements and related explanations are omitted so as not to obscure the inventive concepts presented herein.

U.S. patent application Ser. No. 10/244,496 ("the '496 application"), filed Sep. 16, 2002 and titled "Position Sensor Emulator for a Synchronous Motor/Generator," which discloses embodiments for deriving rotor position information from phase voltage signals output by main generator stator windings (stator phase windings) of a synchronous motor generator, is incorporated herein by reference.

Figure 2:
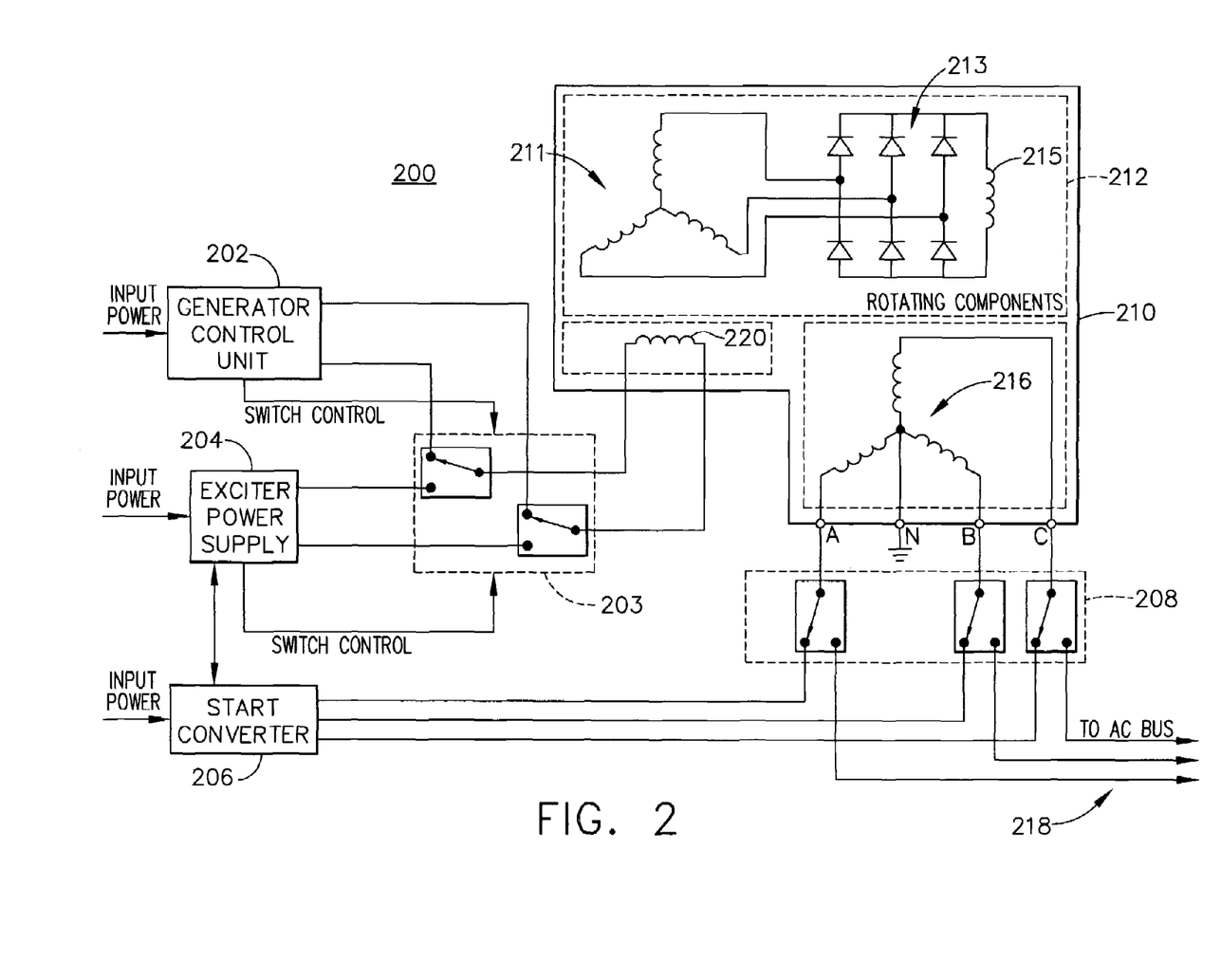
FIG. 2 illustrates a synchronous motor generator system to which principles of the present invention may be applied to determine rotor position.

FIG. 2 illustrates a synchronous motor generator system 200 to which principles of the present invention may be applied to derive rotor position from signals output from stator phase windings. The synchronous motor generator system 200 includes the following main components: a brushless synchronous motor generator 210; a generator control unit 202; an exciter power supply 204; and a start converter 206. The motor generator system 200 further includes motor generator switching units 203, 208, for switching between a generator mode and a motor (starter) mode for the synchronous motor generator 210.

The synchronous motor generator 210 includes a rotating unit 212, including three-phase exciter windings 211, a rectifier bridge 213, and a main generator field winding 215, mounted on a rotatable shaft, e.g., coupled to a gas turbine engine of an aircraft. The synchronous motor generator 210 further includes stator components, including an exciter field winding 220 and three-phase main generator windings 216. The exciter field winding 220 of the stator and the three-phase exciter windings 211 of the rotor constitute an exciter generator and the field winding 215 of the rotor 212 and the three-phase windings 216 of the stator constitute a main generator.

In generator mode, the motor generator switching units 203, 208, which may be for example well known switching elements, are positioned so the generator control unit 202 is connected to supply DC current ("DC excitation") to the exciter field winding 220 (via switch 203) and the outputs, A, B, C, of the three-phase generator windings 216 are connected to an AC bus 218 (via switch 208). In an exemplary embodiment, when DC excitation is supplied to DC winding 220, rotation of the generator shaft (not shown) by the aircraft engine causes the generation of a polyphase voltage in the armature winding 211 that is rectified by the rectifier assembly 213 and coupled to the winding 215. This rectified voltage sets up a DC field in the main rotor field winding 215 which causes a rotating magnetic field in the main stator coil 216 that produces output power with regulated voltage at a point of regulation (POR) 208 (prior to the bus contact switch) for delivery to AC bus 218 via terminals A, B, C, and switch 208. The DC current flowing through the exciter field winding 220 may be varied in amplitude to achieve the desired AC power on the AC bus 218. In generate mode, rotor position information is not required by the system 200.

Additionally, the system 200 may use the starter/generator 210 as a motor to start the aircraft engine. An external power source (exciter power supply—EXPS) 204 is coupled to the generator 210 using the exciter stator 214. The coupled power from EXPS 204 induces AC power through transformer effect in the polyphase winding 211 of the rotor 212 because no relative motion between rotor and stator exists at zero speed. The AC power established in winding 211 may be rectified by rectifier assembly 213 to generate DC power in the main field winding 215. Additionally, a start converter 206 is used to supply controlled AC power to main stator coil 216 such that sufficient torque is produced by the starter/generator 210. This torque is produced by the interaction between the flux in the main rotor winding 215 and the current (flux) established in coil 216. The frequency of the controlled AC power is increased from 0 Hz (0 RPM) to a predetermined frequency corresponding to the generated torque for starter/generator 210 at the end of start. The phase of the current for the supplied AC power input is controlled as function of rotor position to develop the desired torque for starter/generator 210. To create sufficient torque for efficiently moving the rotor via electromagnetic force, commutation of stator phase windings 216 requires that the position of the rotor be known.

Instead of using a resolver or some other dedicated position-sensor to determine rotor position and control commutation, embodiments of the present invention take advantage of the fact that signals output by the main generator windings 216 when AC current is applied to the exciter field winding 220 contain a rotor position-dependent component that can be extracted and processed to emulate voltages induced in sine and cosine pickup windings of a resolver. The '496 application discloses multiple embodiments that emulate a resolver by extracting and processing such signals for controlling a synchronous motor generator system. In one aspect, principles of the present invention enhance the techniques disclosed in the '496 application by varying the frequency applied to the exciter field winding 220 during start mode as a function of rotation speed of the shaft, in such a manner as to facilitate extracting position-indicating components of the signals output by the main generator windings 216, over a wider rotational speed range. Depending on the characteristics of the synchronous machine and the application, the detection range may increase to approximately 70–80% of the rotor speed range required for start. For some implementations/applications, the position sensing technique of the present invention eliminates the need for an alternative position sensing algorithm at higher rotor speed ranges during start mode. It may be desirable to switch to an alternate position sensing algorithm for higher rotor speeds during start mode in other implementations/applications.

In another aspect, the present invention has the inherent benefits of field weakening, wherein, the voltage magnitude at terminals A, B, C of the three-phase main generator windings 216 is maintained within acceptable limits. For increasing rotational speeds, the method of increasing excitation frequency as already described in the previous aspect of the invention, has the effect of reducing back emf and thus, the voltage at the terminals A, B, C, of motor/generator windings 216 is also controlled. These principles of the present invention are detailed below with reference to an embodiment similar to that disclosed in the '496 application, although it should be realized that these principles may be applied to other embodiments and implementations.

Figure 3:
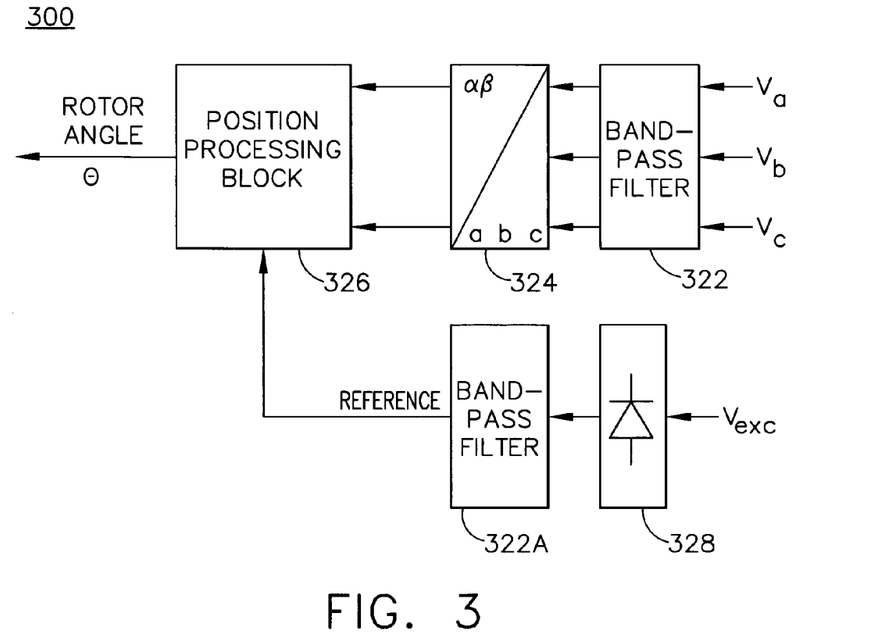
FIG. 3 is a block diagram of a position deriving apparatus according to an embodiment of the present invention.
Figure 4:
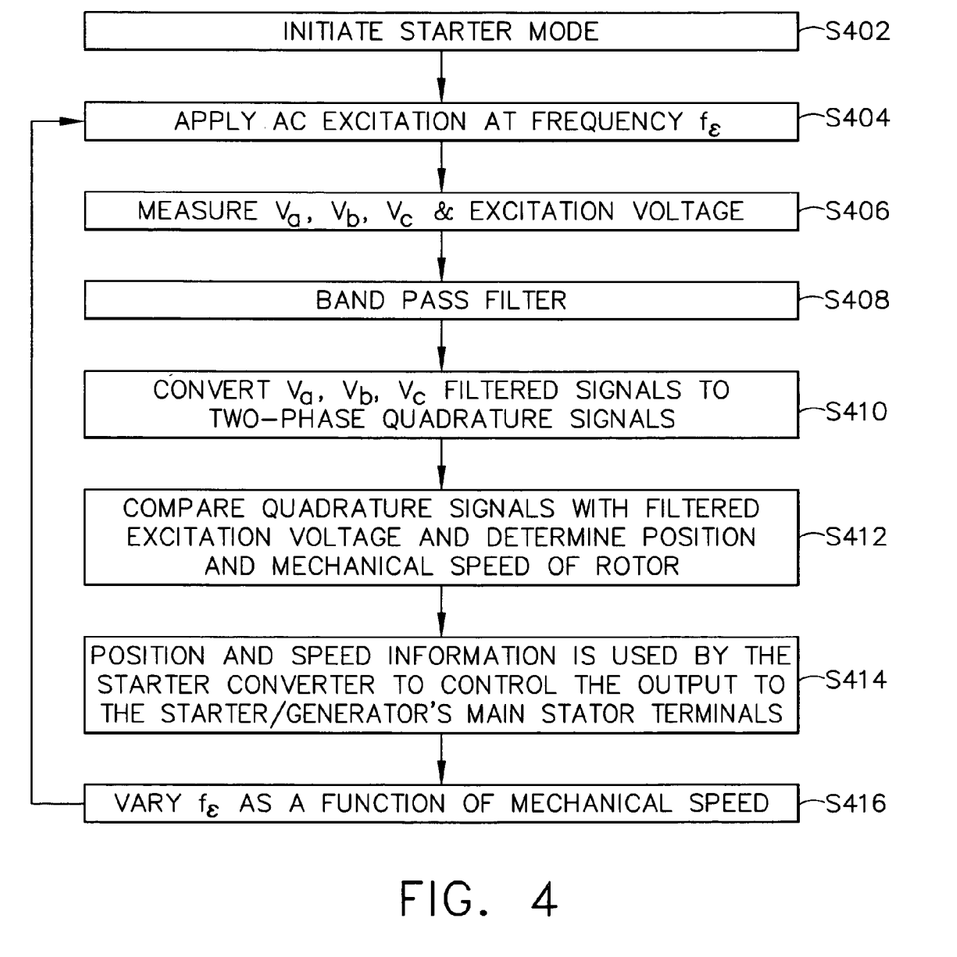
FIG. 4 is a flow diagram illustrating a position deriving operation according to an embodiment of the present invention.

FIG. 3 illustrates block diagram of a position sensor emulator 300 according to an embodiment of the present invention. This position sensor emulator 300 may be implemented as a component of the start converter 206. As seen in FIG. 3, the position sensor emulator 300 includes: a bandpass filter 322; a converter 324; and a position processor 326. The position sensor emulator 300 of this embodiment further includes a rectifier 328 and a second bandpass filter 322A. Operation of the position sensor emulator 300 will be described below with reference to the flow diagram of FIG. 4. The present invention provides an enhanced sensorless system that emulates a resolver-type position sensor by using the similarity between the main rotor of the synchronous machine and a position sensor or resolver. As described above, when the starter mode is initiated (S402), controlled AC power from the exciter power supply 204 is applied to the field winding 220 of the rotor of the motor generator 210 (S404) resulting in the main rotor behaving as a position sensor, due to its salient construction. This reaction is similar to a resolver-type position sensor. Accordingly, the sensorless system of the present invention continuously detects the voltages on the main stator phase windings 216, $V_A$, $V_B$, $V_C$ (S406), to produce a set of signals that define the rotor position. The position information is obtained from the stator phase voltages of the motor generator after being filtered by the bandpass filter 322 (S408) and converted by converter 324 (S410). For example, converter 324 can use the well known Clarke transformation (a,b,c/α,β) that converts three-phase quantities (a,b,c) into balanced two-phase quadrature quantities (α,β). The output signals from the converter 324 are fed to a position processing block 326 for determining rotor position (S412) by relying on the fact that the extracted two-phase quadrature quantities emulate the voltages induced in sine and cosine pickup windings of a resolver. The exciter voltage from the exciter power supply 204 is passed through rectifier 328 and bandpass filter 322A to provide a reference signal, as described for example in the '496 application.

Those skilled in the art will appreciate that the position sensor emulator 300 may include additional elements. The position sensor emulator 300 of the present invention extracts signals that emulate signals of a resolver. Therefore, the position processing block 326 can be a conventional position processing block. The position information is then used by the start converter's motor controls (S414).

Figure 5:
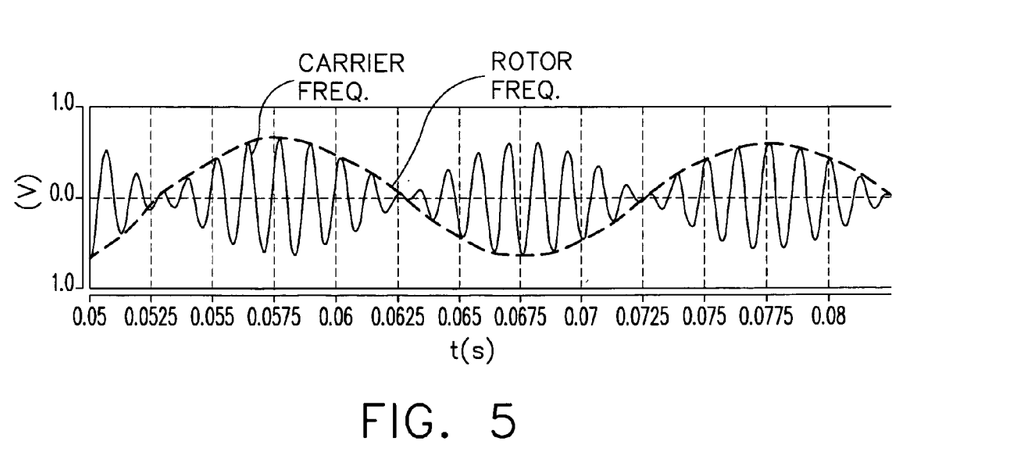
FIG. 5 is a waveform of an exemplary filtered phase voltage output signal monitored to derive rotor position in accordance with an embodiment o the present invention.

Assuming constant excitation frequency, main stator phase voltages $V_A$, $V_B$, $V_C$ contain three frequency components: the frequency corresponding to the mechanical speed of the rotor, the inverter switching frequency and a frequency coupled into the main stator windings 216 from the field winding 215 containing the rotor position information. FIG. 5 illustrates an exemplary phase voltage signal, comprising a frequency component carrying rotor position information ("carrier frequency"), and a frequency component reflecting the frequency of the rotor. Therefore, the rotor position/speed can be obtained by proper detection and processing of the frequency components in the main stator phase voltages of the motor generator 210. In the present invention, in addition to emulating a resolver-type position sensor by using signals output by the stator phase windings 216 as previously described in the '496 application, an embodiment of the present invention varies the excitation frequency (S416) as a function of rotor speed to increase the position detection range of the position sensor.

In an embodiment of the '496 application, the pass frequencies corresponded to the following equation:

$$f = 2 \cdot N_{ph} \cdot f_{ex} \pm \omega_{et}$$

in which f is the pass frequency of the filter; $N_{ph}$ is the number of phases in the exciter stator; $f_{ex}$ is the frequency of the exciter voltage; and $\omega_{et}$ is the top electrical angular speed of the motor generator stator (e.g., 2× mechanical speed for a 4-pole machine). For example, in a system having a single phase exciter stator operating at 400 Hz and a top electrical angular speed of the main stator of the motor/generator of 250 Hz, the resulting pass frequencies range would be:

$$f = 2 \cdot 1 \cdot 400 \pm 250 = 550 \text{ to } 1050 \text{ Hz}.$$

According to an embodiment of the present invention, the variation of the excitation frequency as a function of rotor speed effectively provides separation between a frequency of the phase voltage signals carrying rotor position information and a rotor frequency component of the phase voltage signals. More specifically, the exciter power supply 204 increases the excitation frequency $f_{ex}$ from the initial value $f_{init}$ to:

$$f_{ex} = f_{init} + 2 \cdot f_{e\_st}$$

where $f_{e\_st}$ is the electrical frequency of the main stator. By using this excitation frequency, the signal containing position information has the frequency:

$$f_{sig} = 2 \cdot N_{ph} \cdot (f_{init} + 2 \cdot f_{e\_st}) \pm f_{e\_st}$$

where $N_{ph}$ is the number of phases in the exciter stator. This is equivalent with (after algebraic manipulations):

$$f_{sig} = 2 \cdot N_{ph} \cdot f_{init} + f_{e\_st} \cdot (4 \cdot N_{ph} \pm 1).$$

Applying this formula to the exemplary machine described above, and assuming $f_{init}$ of 400 Hz, the resulting carrier frequency would vary from 800 to 1550 Hz (applying the case with the minus sign) or 800 to 2050 Hz (applying the case with the plus sign). Significantly, varying the excitation frequency as a function of rotor speed results in a high ratio of carrier frequency to the rotor frequency over a range of rotor speeds, thereby increasing the position detection range and facilitating the extraction of accurate position information from the carrier frequency.

The filtered signals from bandpass filter 322 are passed to converter 324, which converts the filtered three-phase voltage signals (a,b,c) into balanced two-phase quadrature quantities (α,β), as noted above. These types of conversions/transformations are well known in the art. For example, this conversion can be accomplished as follows:

$$V_\alpha = \frac{1}{3}(2 \cdot V_{ab} - V_{bc} - V_{ca})$$

-continued $$V_\beta = \frac{1}{\sqrt{3}}(V_{ca} - V_{bc})$$

Further details regarding the above-described equations can be found in standard textbooks such as Krause et al., *Analysis of Electric Machinery*, IEEE press, 1995, pages 135–161, which is incorporated herein by reference. Additionally, if the system is balanced the transformation can be reduced to the following equations:

$$V_\alpha = (V_{ab})$$

$$V_\beta = -\frac{1}{\sqrt{3}}(V_{ab} + 2 \cdot V_{bc})$$

which simplifies the calculation of the conversion further. The $V_\alpha$ and $V_\beta$ are equivalent to the sine and cosine outputs of a conventional resolver. Because the position sensor emulator replicates the signals of a conventional resolver (e.g., sine, cosine, and reference signals) the position processing block 326 can be implemented by using conventional techniques and equipment. For example, an Analog Devices AD2S80A Resolver-to-Digital converter can be used as the position processing block 226, which receives the emulated signals from the position sensor emulator and converts these signals into a rotor position (i.e., rotor angle). Alternatively, an algorithm can be used to extract the angular position, such as:

$$\theta = \mathrm{Tan}^{-1}\frac{V_\alpha}{V_\beta}.$$

In another aspect, the present invention has the inherent benefits of field weakening, wherein, the voltage magnitude at terminals A, B, C of the three-phase main generator windings 216 is maintained within acceptable limits. For increasing rotational speeds, the method of increasing excitation frequency as already described in the previous aspect of the invention, has the effect of reducing back emf and thus the voltage at the terminals A, B, C, of motor/generator windings 216 is also controlled. In this way, AC excitation amplitude does not need to be varied or controlled separately or independently, as rotor speed increases in an effort to reduce back emf.

The foregoing illustrates the principles of the invention. It will be appreciated by those skilled in the art that various arrangements of the present invention can be designed. For example, the band of the bandpass filters and converters can be implemented in analog, digital, or hybrid configurations. Those skilled in the art will appreciate that the filters and converters can be implemented in software and/or hardware or in a single device such as an application specific integrated circuit (ASIC). The band of the filters can be established in narrower or broader ranges than the examples provide. Those skilled in the art will appreciate that the ranges can be optimized based upon the specific requirements of the system and design of the synchronous machine (e.g., number of poles, and the like), which form the basis for calculating the appropriate passband frequencies. Therefore, the scope of the invention is not limited by the foregoing description but is defined solely by the appended claims.

What is claimed is:

1. A position sensing apparatus for deriving rotor position of a synchronous machine from signals output from said machine, said apparatus comprising:
   a bandpass filter that filters phase voltage signals output from main stator windings of said synchronous machine during AC excitation, thereby extracting a rotor position-indicating component from said phase voltage signals;
   a converter that converts the filtered phase voltages into balanced two-phase quadrature signals, said balanced two-phase quadrature signals indicating positioning of said rotor; and
   an excitation controller for controlling AC excitation frequency, of an AC excitation supplied to an exciter field winding of a stator of said machine, as a function of rotor speed, thereby increasing a position detection range of said position sensing apparatus.

2. The position sensing apparatus of claim 1, wherein said synchronous machine is a synchronous brushless machine.

3. The position sensing apparatus of claim 1, wherein said rotor is on a shaft coupled to a gas turbine engine of an aircraft.

4. The position sensing apparatus of claim 1, wherein said bandpass filter has a fixed passband over a range of rotor speeds.

5. The position sensing apparatus of claim 4, wherein the fixed passband is defined as a function of:

$$f_{sig} = 2 \cdot N_{ph} \cdot f_{init} + f_{e\_st} \cdot (4 \cdot N_{ph} \pm 1)$$

wherein $f_{sig}$ is a frequency of a signal containing rotor position information, $N_{ph}$ is a number of phases in an exciter stator, $f_{e\_st}$ is the electrical frequency of a main stator voltage, and $f_{init}$ is an initial AC excitation frequency.

6. The position sensing apparatus of claim 1, wherein the two-phase quadrature signals are used as inputs to emulate a position sensor in a drive system for the synchronous machine.

7. The position sensing apparatus of claim 6, wherein the two-phase quadrature signals are used as inputs to emulate a resolver.

8. The position sensing apparatus of claim 1, wherein
   a Clarke transformation is used to convert the filtered phase voltages into the balanced two-phase quadrature signals, and
   said position sensing apparatus further comprises:
   a rectifier that rectifies exciter voltage signals of the said synchronous machine; and
   a second bandpass filter that filters the rectified exciter voltage signals to generate a reference signal.

9. The position sensing apparatus of claim 1, wherein AC excitation amplitude is maintained substantially constant over a range of rotor speeds.

10. The position sensing apparatus of claim 1, wherein AC voltage at output terminals of the machine is maintained below a preset level due to a field weakening caused by the AC excitation frequency control.

11. The position sensing apparatus of claim 1, wherein said excitation controller varies AC excitation frequency to substantially maximize the ratio between a phase voltage frequency component carrying rotor position information and a rotor frequency component.

12. A position sensing method for deriving rotor position of a synchronous machine from signals output from said machine, said method comprising:

bandpass filtering phase voltage signals output from main stator windings of said synchronous machine during AC excitation, thereby extracting a rotor position-indicating component from said phase voltage signals;

converting the filtered phase voltages into balanced two-phase quadrature signals, said balanced two-phase quadrature signals indicating positioning of said rotor; and controlling AC excitation frequency, of an AC excitation supplied to an exciter field winding of a stator of said machine, as a function of rotor speed, thereby increasing the position detection range of the position sensing method.

13. The position sensing method of claim 12, wherein said synchronous machine is a synchronous brushless machine.

14. The position sensing method of claim 12, wherein said rotor is on a shaft coupled to a gas turbine engine of an aircraft.

15. The position sensing method of claim 12, wherein said bandpass filtering is performed using a fixed passband over a range of rotor speeds.

16. The position sensing method of claim 15, wherein the fixed passband is defined as a function of:

$$f_{sig} = 2 \cdot N_{ph} \cdot f_{init} + f_{e\_st} \cdot (4 \cdot N_{ph} \pm 1)$$

wherein $f_{sig}$ is a frequency of a signal containing rotor position information, $N_{ph}$ is a number of phases in an exciter stator, $f_{e\_st}$ is the electrical frequency of a main stator voltage, and $f_{init}$ an initial AC excitation frequency.

17. The position sensing method of claim 12, wherein the two-phase quadrature signals are used as inputs to emulate a position sensor in a drive system for the synchronous machine.

18. The position sensing method of claim 17, wherein the two-phase quadrature signals are used as inputs to emulate a resolver.

19. The position sensing method of claim 12, wherein a Clarke transformation is used to convert the filtered phase voltages into the balanced two-phase quadrature signals, and said position sensing method further comprises:

rectifying exciter voltage signals of said synchronous machine; and bandpass filtering the rectified exciter voltage signals to generate a reference signal.

20. The position sensing method of claim 12, wherein AC excitation amplitude is maintained substantially constant over a range of rotor speeds.

21. The position sensing method of claim 12, wherein the AC voltage at output terminals of the machine is maintained below a preset limit due to a field weakening caused by the AC excitation frequency control.

22. The position sensing method of claim 12, wherein said AC excitation frequency control varies AC excitation frequency to substantially maximize the ratio between a phase voltage frequency component carrying rotor position information and a rotor speed frequency component.

* * * * *